US008490263B2

(12) United States Patent
Whitaker

(10) Patent No.: US 8,490,263 B2
(45) Date of Patent: Jul. 23, 2013

(54) INJECTOR SLEEVE REMOVAL TOOL

(75) Inventor: Tony Whitaker, Campbellsville, KY (US)

(73) Assignee: Whitaker Tools, Inc., Mannsville, KY (US)

( * ) Notice: Subject to any disclaimer, the term of this patent is extended or adjusted under 35 U.S.C. 154(b) by 578 days.

(21) Appl. No.: 12/584,060

(22) Filed: Aug. 28, 2009

(65) Prior Publication Data

US 2010/0095500 A1 Apr. 22, 2010

Related U.S. Application Data

(60) Provisional application No. 61/190,441, filed on Aug. 28, 2008.

(51) Int. Cl.
*B23P 19/04* (2006.01)

(52) U.S. Cl.
USPC .................................. 29/264; 29/270; 29/278

(58) Field of Classification Search
USPC ............................ 29/264, 255, 270, 278, 280
See application file for complete search history.

(56) References Cited

U.S. PATENT DOCUMENTS

| | | | | |
|---|---|---|---|---|
| 2,050,005 A | | 8/1936 | Heegeman | |
| 2,424,681 A | | 7/1947 | Eberhart | |
| 3,685,124 A | | 8/1972 | Wuertz | |
| 4,967,468 A | | 11/1990 | Vossbrinck et al. | |
| 5,075,948 A | | 12/1991 | Maier | |
| 5,090,102 A | | 2/1992 | Lovell | |
| 5,664,328 A | | 9/1997 | Fink et al. | |
| 5,784,783 A | | 7/1998 | Carpenter | |
| 6,601,277 B1 | * | 8/2003 | Swanson | 29/256 |
| 6,637,089 B1 | * | 10/2003 | English | 29/264 |
| 6,990,713 B2 | * | 1/2006 | Tally et al. | 29/264 |
| 7,658,368 B2 | * | 2/2010 | Laun | 254/18 |
| 7,832,071 B2 | * | 11/2010 | Klann | 29/214 |
| 7,987,571 B2 | * | 8/2011 | English | 29/264 |
| 2003/0041431 A1 | | 3/2003 | Heflin | |
| 2003/0188410 A1 | | 10/2003 | English | |
| 2007/0145321 A1 | | 6/2007 | Lowery | |
| 2008/0235930 A1 | * | 10/2008 | English | 29/426.5 |

FOREIGN PATENT DOCUMENTS

DE 4201034 7/1993

* cited by examiner

*Primary Examiner* — Lee D Wilson

(74) *Attorney, Agent, or Firm* — Carrithers Law Office PLLC

(57) ABSTRACT

A tool for removing an injector sleeve from the cylinder head of a diesel engine between the rocker arms while the head remains mounted to the engine block within the vehicle. The devices includes a tap having a longitudinal body and a thread cutting head at one end. A drive member comprises a bolt having a head at one distal end. An extraction nut is threaded onto the threaded shaft of the drive member followed by a bearing surface member such as a spacer. A hollow cylinder or support sleeve having an internal diameter greater than the injector sleeve to be removed and an external diameter less than the diameter of the sleeve bore includes a shoulder member.

6 Claims, 8 Drawing Sheets

INJECTOR SLEEVE REMOVAL TOOL

RELATED APPLICATIONS

This application claims priority from U.S. Provisional Patent application Ser. No. 61/190,441 filed on Aug. 28, 2008 which is incorporated by reference herein in its entirety.

BACKGROUND OF THE INVENTION

1. Technical Field

The present invention relates to the field tools used to remove a typically brass or bronze injector sleeve from a cylinder head in a diesel engine. These sleeves are press fit into a bore in the head. After years of use the sleeves will loosen or begin to leak and need to be replaced.

2. Description of the Related Art

Tools for the removal of injector sleeves have been described and patented in recent years. U.S. Pat. No. 5,784,783 by Carpenter for METHOD OF REMOVING AND INJECTOR SLEEVE issued on Jul. 28, 1998 claims a tool wherein one inserts rounded head into the sleeve. A cylinder with a reverse tapered edge is forced down onto the top edge of the sleeve. This flairs the top edge inward, thus capturing the rounded head within the sleeve. The rounded head is pulled up and the intent is that the flair will hold tight to the rounded head and the sleeve will be pulled out with it. This design has some inherent flaws. First, the flaring process forces the sleeve into the head even tighter than it would initially be. Second, if the sleeve is tight, as one would expect, the flair is likely to weaken and pull apart, whereupon, the rounded head comes out but the sleeve has been seated even tighter.

U.S. Pat. No. 5,090,102 by Lovell for DIESEL INJECTOR SLEEVE REMOVER issued on Feb. 25, 1992 claims a hollow, externally threaded tube which has been slit down one side. A rod is inserted in the tube which is conical at the bottom end. The rod sticks out of the slitted threaded end of the tube and the large end of the rod is a little larger than the threaded tube. The top end of the rod is connected to a slide hammer. The threaded sleeve is inserted into the sleeve. One tap of the hammer seats the threads of the tube into the bore of the sleeve because tapping the hammer down against the top of the sleeve forces the sleeve down onto the conical end of the rod and this causes the threaded tube to expand, thus forcing the threads to grab into the bore of the sleeve. Now the slide hammer is pulled up to drive the assembly out along with the sleeve. The primary weakness of this design presents itself in the case where the sleeve is very tightly held within the cylinder head. The threads won't have a strong enough hold and will simply chew and pull material out of the sleeve but leave the sleeve in place in the head.

SUMMARY OF THE INVENTION

A tool is disclosed herein used for removing an injector sleeve from the cylinder head of a diesel engine without the extra labor and cost of removing the entire head from the diesel engine.

An injector sleeve is used to seal each of the cavities in the top of a cylinder head or heads of a diesel. The sleeve maintains a clean environment within the cylinder head cavity by keeping external debris outside. The sleeve is generally made of brass or bronze and is sized to be pressed into the cavity. If the sleeve fails, leaks can occur and it must be replaced. This can require removal of the cylinder head, which is costly in terms of time and money. A huge savings is realized if the sleeve or sleeves can be removed without the removal of the cylinder head. The present invention is a tool which makes sleeve removal possible without removing the cylinder head.

A tool is disclosed herein used for removing an injector sleeve from the cylinder head of a diesel engine between the rocker arms while the head remains mounted to the engine block within the vehicle. The devices includes a tap having a longitudinal body having a threaded cutting head at one end and an axial threaded bore at the opposing end. A drive member comprises a bolt having a head at one distal end and a threaded shaft body portion. An extraction nut is threaded onto the threaded shaft of the drive member followed by a bearing surface member such as a spacer. A washer bearing surface member having an axial hole sized for movable engagement on the threaded shaft is disposed on the threaded shaft after the spacer. A hollow cylinder or support sleeve having an internal diameter greater than the injector sleeve to be removed and an external diameter less than the diameter of the sleeve bore includes a shoulder member projecting outwardly from the exterior of the support sleeve at a selected point. Moreover, a washer bearing surface member having a center hole is disposed onto the threaded end of a bolt having a holding nut threaded thereon spaced apart a selected distance from the threaded distal end. The threaded distal end of the bolt is inserted into and threadably engages threads of the tap nut so that the bolt is fastened to the tap. The end of the injector sleeve removal tool defining the tap assembly is passed through a hollow cylinder of a selected diameter sized so that the end edges of the tube rest on the surface of the cylinder head surrounding the injector sleeve to be removed. The washer bearing surface member is selected having an outer diameter large enough to provide a bottom surface for resting on the top edge of the hollow cylinder. The holding nut rests upon the top surface of the washer bearing surface member above the hollow cylinder. The head of the bolt opposite the tap assembly is rotated with a tool, whereby the distal end having the tap assembly turns to cut threads into the interior surface of the injector sleeve securing same. The head of the bolt is held in a stationary position and the holding nut is then turned and moved downwardly biasing the bottom surface of the washer bearing surface member against the top edges of the hollow cylinder pulling the injector sleeve upward and out of the cylinder head in order that a replacement injector sleeve can be pressed into place in the cylinder head.

The injector sleeve removal tool is described and can be fabricated by the following method. A thread cutting device commonly known as a tap is modified by attaching a threaded nut to its non-threaded end. This allows a bolt to be threaded into the nut and therefore fastened to the tap. A loose nut and a flat washer bearing surface member are put onto the bolt (in that order) before threading it into the nut which was welded onto the end of the tap. This assembly is passed through a hollow cylinder sized to sit on the edge of the cylinder head just surrounding the injector sleeve to be removed. The flat washer bearing surface member is large enough so that it won't pass through but rests on the top edge of the hollow cylinder. The bolt (with the tap to which it is fastened) is now used to cut 2 or three turns of threads into the injector sleeve. Now, the loose nut is tightened to gently and evenly withdraw the bolt assembly and the injector sleeve along with it.

Alternative embodiments may have the bolt welded directly to the tap, or even simultaneously cast as one piece with it, or any other stable method of attachment. Also, the flat washer bearing surface member and cylinder on which it rests may be welded together or otherwise attached or fabricated together as one would make a can or pan.

Experience has shown that two or three turns of thread into the sleeve are sufficient to pull the sleeve. One superior aspect of this design is that one can turn in more threads if required. Also, the pulling method is the even, central and straight thrust provided when the loose nut is tightened against the flat washer bearing surface member. This is believed to be more stable and powerful than that of tools that use the uneven strikes of a slide hammer.

A major feature of the present invention is that it allows the sleeves to be removed without having to remove the engine from the vehicle saving time, labor, expense, and increasing safety.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention, a tool is disclosed herein used for removing an injector sleeve from the cylinder head of a diesel engine without the extra labor and cost of removing the entire head from the diesel engine.

Figure 1:
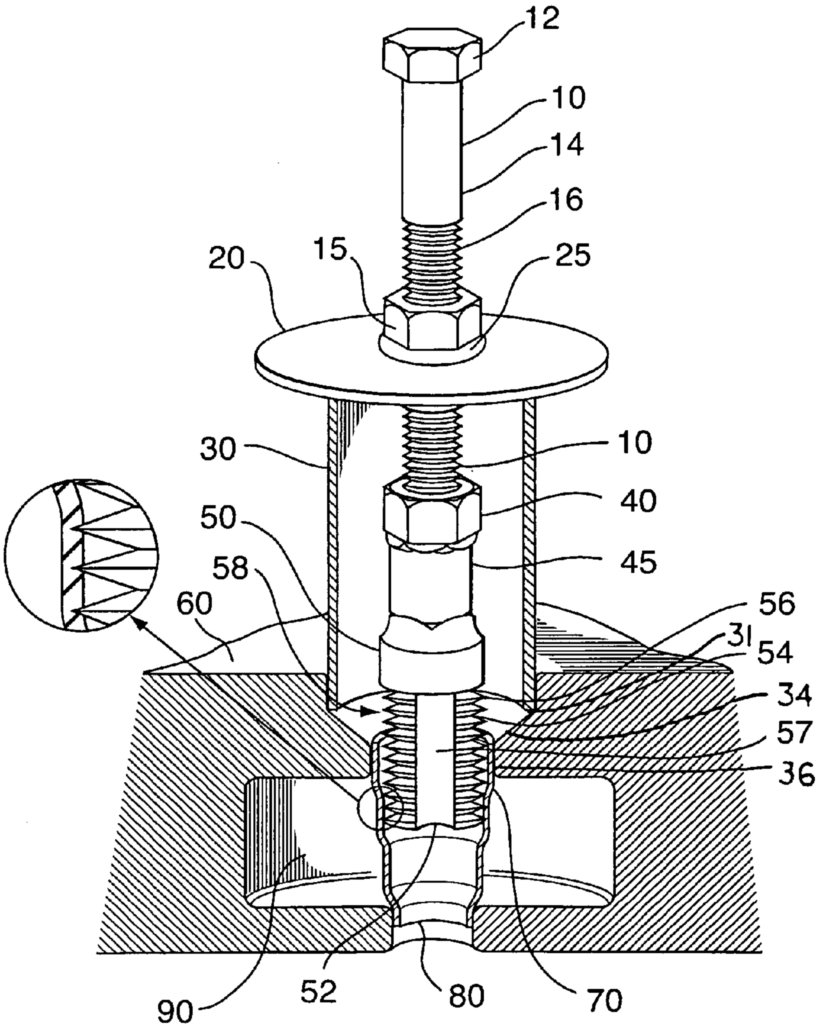
FIG. 1 is an oblique view of the injector sleeve removal tool assembly inserted into an injector sleeve which is press fitted into a cylinder head.

FIGS. 1-4 show the assembled tool for removing an injector sleeve described as follows. An axially moveable threaded rotating extraction nut 15 is threaded onto a drive member 7 including a bolt 10 having a head 12 defining a holding means extending from a shaft 14 having threads 16 at least along its distal end opposite the head 12. In the embodiment of FIG. 1, about one and one half inches of the threads 16 of bolt 10 extend through rotating nut 15.

A tap 50 threadably engages the bolt 10. As shown in FIG. 1-4, the tap 50 includes a means for holding a threaded member having an external holding means comprising stationary nut 40 is attached by means such as welding or casting onto a non-threaded distal end 45 of the tap 50. The opposing distal end 52 of the tap 50 comprises a generally cylindrical threaded cutting head end portion 54 including threads 56 which extend coaxially in a horizontal plane rather than an inclined plane such as typical of a screw. Moreover, the threads 56 extend circumferentially around the end portion 54 in a discontinuous manner forming a plurality of smooth parabolic axial grooves 57 disposed between axial threaded sections 58. In at least one preferred embodiment, the six grooves are disposed between six threaded sections defining a cross sectional hexagon shape. Of course it is contemplated that the threads could be arranged in an inclined plane to bite into the inner wall of the sleeve 80.

A washer bearing surface member 20, is disposed between the rotating nut 15 and a hollow sleeve or cylinder 30 which has a large enough inner diameter for tap 50 to rotatably move therein and for the injector sleeve 80 to easily slide up and into it. The length of cylinder 30 must be longer than the tap 50 and stationary nut 40 combination and the available threads left on the bolt 10 after it is assembled with the rotating extraction nut 15, washer bearing surface member 20 and stationary nut 40. Enough threads 57 must be exposed to reach into and cut at least three threads into the interior side wall of an injector sleeve 80. The washer bearing surface member 20 can be of a selected thickness but must include a center hole (not shown) large enough to allow axial movement along the bolt shaft 14. The diameter of the washer bearing surface member 20 must be at least large enough to engage the top end edge of the cylinder 30. As shown in FIG. 1, the washer bearing surface member 20 can comprise another smaller washer 25 or a plurality of stacked washers.

As shown in FIG. 1, the end 31 of the cylinder 30 rests on the cylinder head 60 and more particularly within a conical depression or seat 34 formed around the injector bore 36 of the cylinder head 60.

Figure 2:
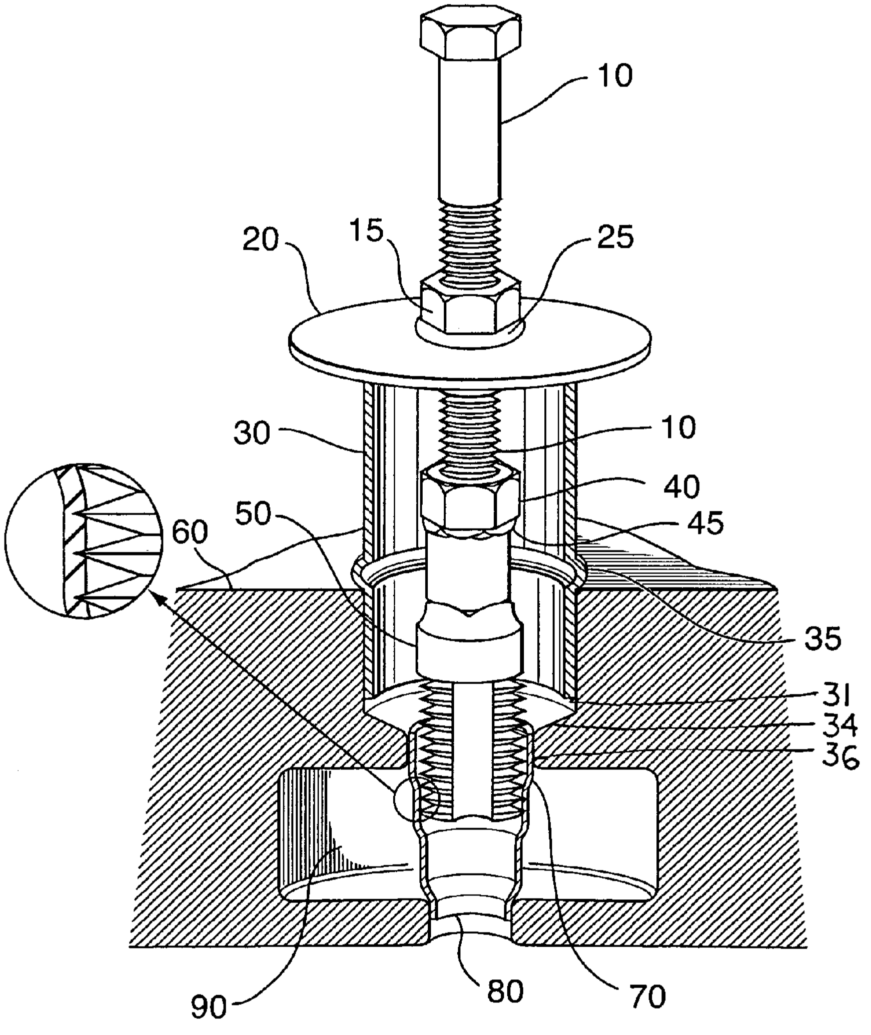
FIG. 2 is a perspective showing a stop mean formed within the tool cylinder whereby a circumferential ring contacts the cylinder head of the engine limiting penetration of the tool cylinder therein.

As shown in FIG. 2, a annular or circumferential ring stop mean 35 is formed around the exterior diameter of the cylinder 30 whereby it contacts the cylinder head 60 of the engine limiting penetration of the cylinder 30 therein.

Figure 3:
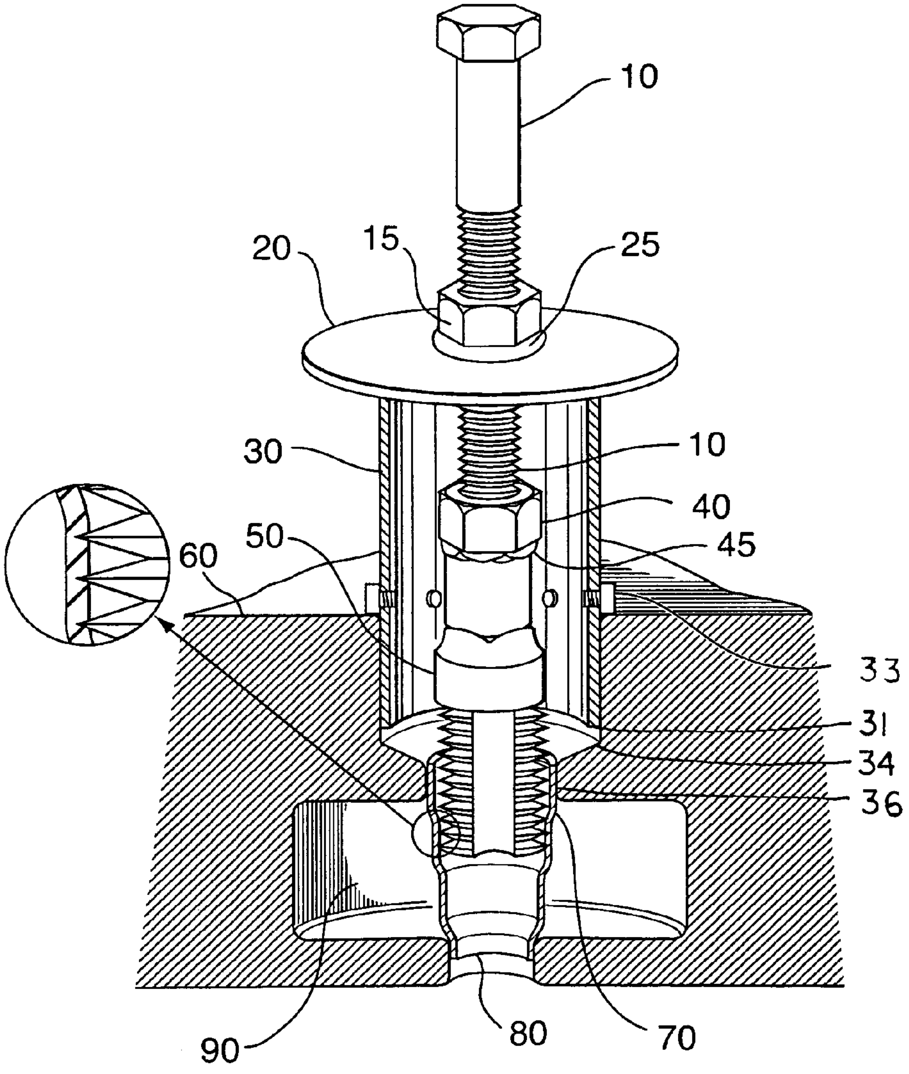
FIG. 3 is a perspective view showing stop mean comprising bolts used to limit penetration of the tool cylinder into the cylinder head.

FIG. 3 shows an optional stop mean 35 comprising bolts extending from the side of the cylinder 30 used to limit penetration of the cylinder 30 into the cylinder head 60.

Figure 4:
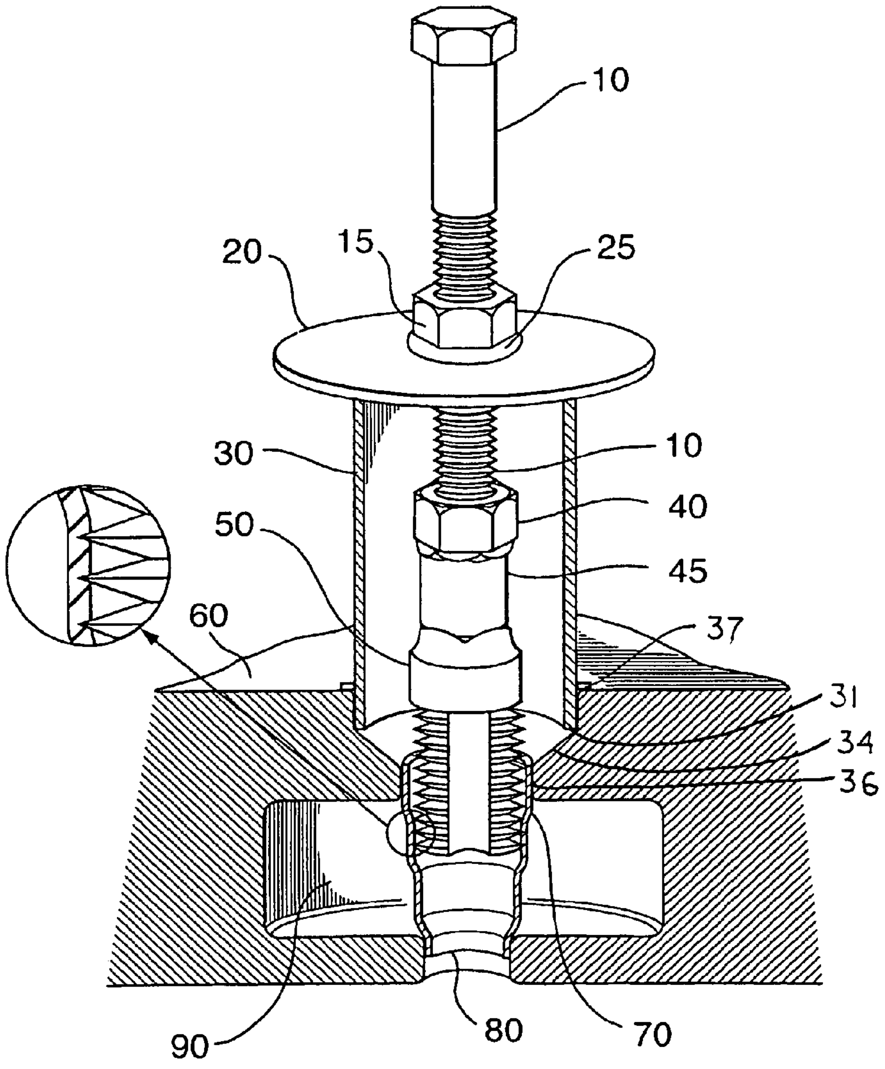
FIG. 4 is a perspective view showing an optional stop means comprising projections such as pins are used to limit penetration of the tool cylinder into the cylinder head of the engine.
Figure 5:
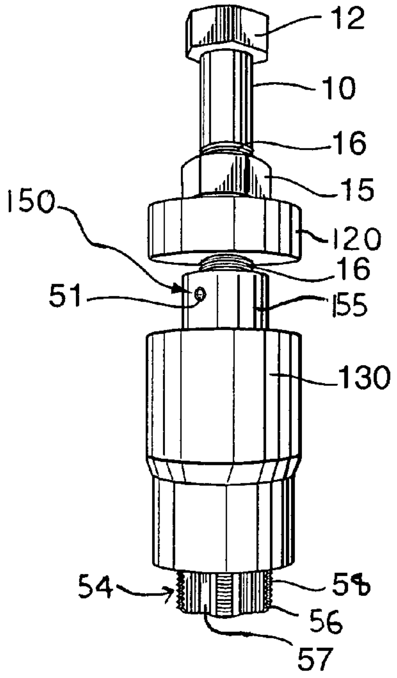
FIG. 5 is a perspective view showing an embodiment of the sleeve removal tool assembly.
Figure 6:
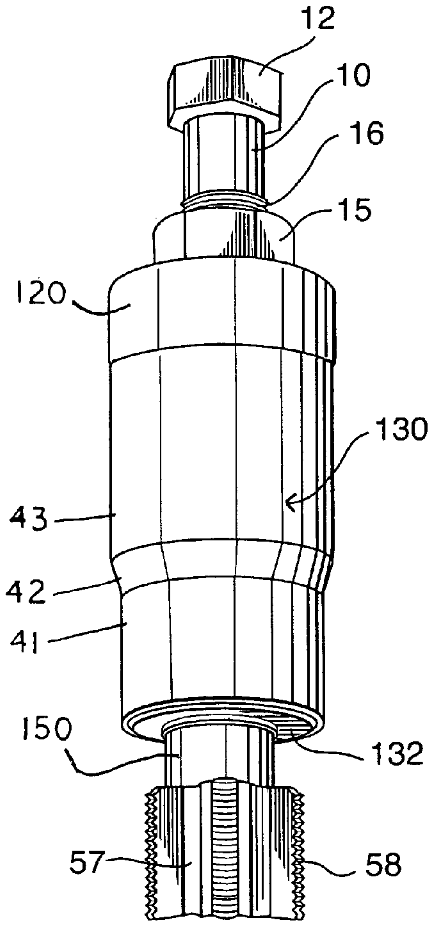
FIG. 6 is a perspective view showing an embodiment of the sleeve removal tool assembly.
Figure 7:
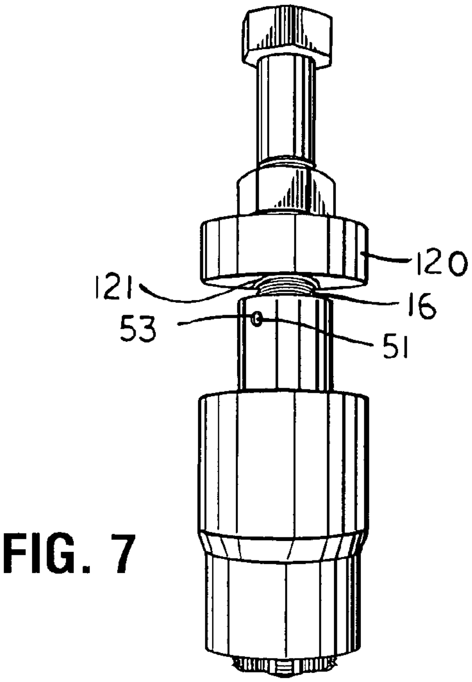
FIG. 7 is a perspective view showing an embodiment of the sleeve removal tool assembly.
Figure 8:
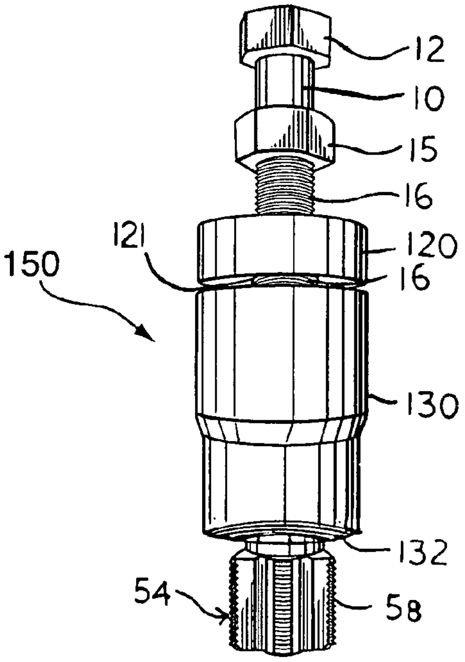
FIG. 8 is a perspective view showing an embodiment of the sleeve removal tool assembly.
Figure 9:
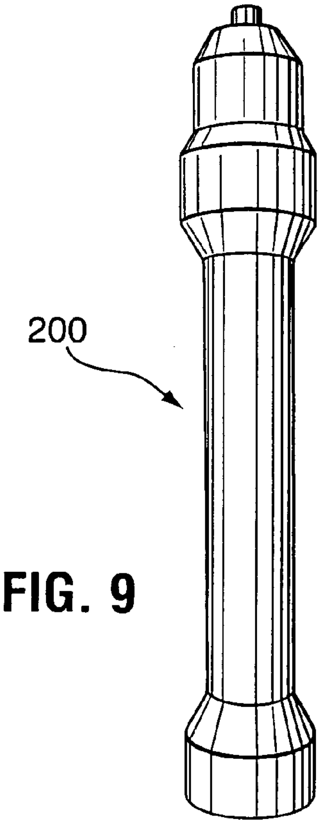
FIG. 9 is a perspective view of an injector insertion tool.

FIG. 4 shows an optional stop mean 35 comprising projections such as pins of a circumferential ring used to limit penetration of the cylinder 30 into the cylinder head 60.

FIGS. 5-8 and 10-12 show an alternate embodiment of the assembled tool 150 for removing an injector sleeve described as follows. An axially moveable threaded drive member including external holding means comprises a rotating extraction nut 15 is threaded onto a bolt 10 having a head 12 defining a holding means extending from a shaft 14 having threads 16 at least along its distal end opposite the head 12. In the embodiment of FIG. 1, about one and one half inches of the threads 16 of bolt 10 extend through rotating extraction nut 15.

A tap 150 threadably engages threads 16 of the bolt 10 and is immovably held in a selected position by a set screw 51 threadably engaging a threaded hole 53 formed in the non-threaded upper portion 55 of the tap 150. The set screw provides a removable an adjustable means for threadably engaging the bolt 10. Of course, as described heretofore and shown in FIGS. 1-4, a stationary nut 40 could be used as an alternate means for adjustably and removably attaching the tap 150 to the bolt 10 wherein the stationary nut 40 or other means could be attached by welding or casting onto a non-threaded distal end (not shown) of the tap 150. The opposing distal end 52 of the tap 150 comprises a generally cylindrical threaded cutting head end portion 54 including threads 56 which extend coaxially in a horizontal plane rather than an inclined plane such as typical of a screw. Moreover, the threads 56 extend circumferentially around the end portion 54 in a discontinuous manner forming a plurality of smooth parabolic axial grooves 57 disposed between axial threaded sections 58. In at least one preferred embodiment, the six grooves are disposed between six threaded sections defining a cross sectional hexagon shape.

Figure 10:
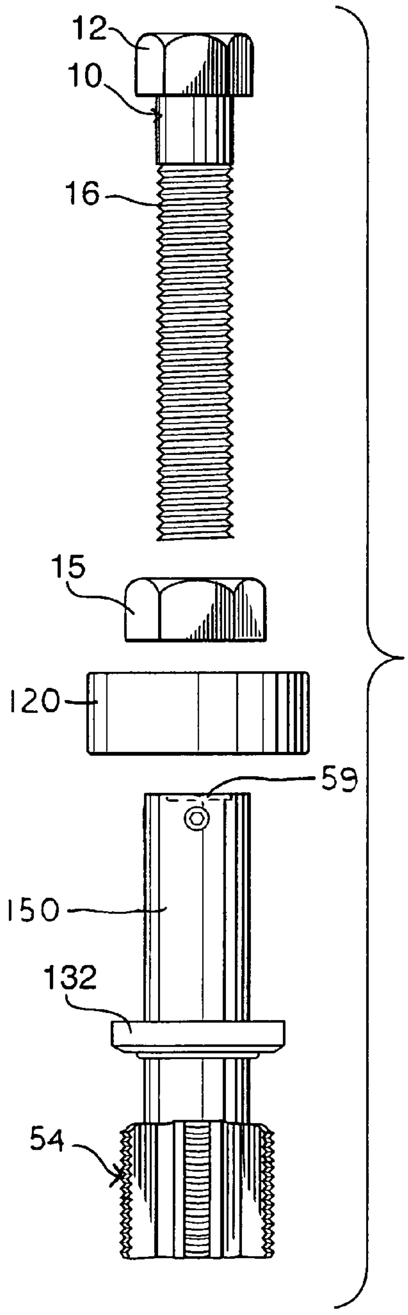
FIG. 10 is an exploded view of an injector sleeve removal tool showing the tap and threaded cutting head, the drive member for engaging the tap, the extraction nut, the bearing surface member, and cylindrical alignment member.
Figure 11:
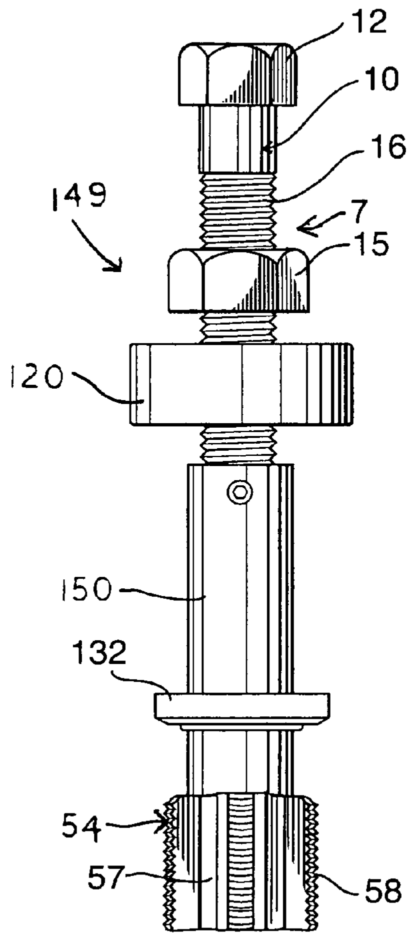
FIG. 11 is a perspective view of the injector sleeve removal tool of FIG. 10.

A washer bearing surface member 120 as shown in FIGS. 5-8 and 10-12 is disposed between the rotating extraction nut 15 and a hollow sleeve or cylinder 130 which has a large enough inner diameter for the tap 50 to rotatably move therein and for the injector sleeve 80 to easily slide up and into it. The length of cylinder 130 must be longer than the tap 150 and stationary holding means and the available threads left on the bolt after it is assembled with the rotating extraction nut 15, washer bearing surface member 120 and means for holding 155. Enough threads 57 must be exposed to reach into and cut at least three threads into the interior side wall of an injector sleeve 80. The washer bearing surface member 120 can be of a selected thickness but must include a center hole 121 large enough to allow axial movement along the bolt shaft 14. The diameter of the washer bearing surface member 120 must be at least large enough to engage the top end edge of the cylinder 30. As shown in FIG. 10, the washer bearing surface member 120 comprises a single thick washer which bears against the cylinder head 60 of the engine or as shown in FIG. 11 against the sleeve or cylinder 130 in order to remove the injector sleeve 80.

Figure 12:
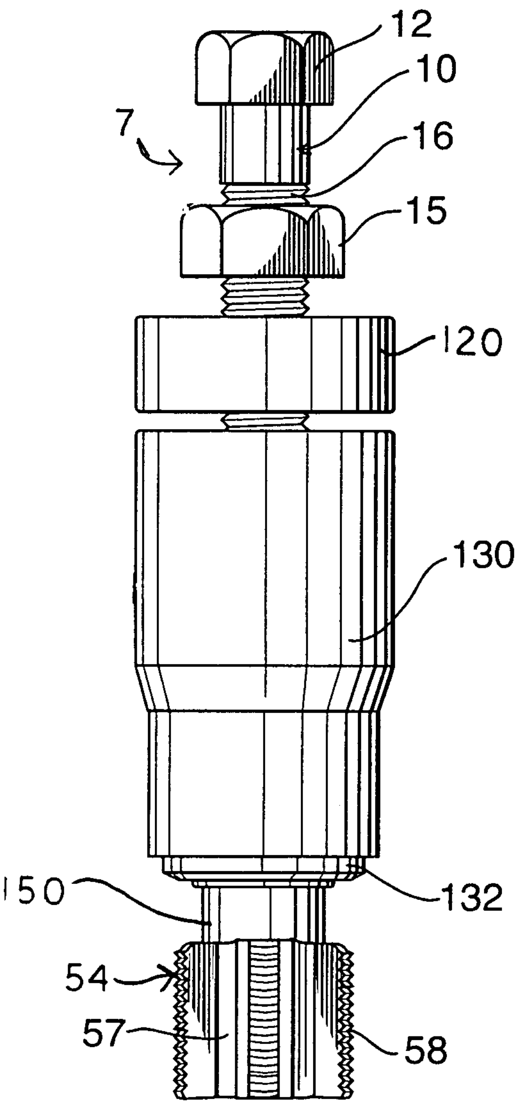
FIG. 12 is a perspective view of the injector sleeve of FIGS. 10 and 11 including a positioning cylinder.

FIG. 10 is an exploded view of an injector sleeve removal tool 149 showing the tap 150 having a longitudinal body, a threaded cutting head 54 at one end and an axial threaded bore 59 at the opposing end. The drive member 7 comprises a bolt having a head 12 at one distal end and a threaded shaft body portion 16 cooperatively engaging the axial threaded bore of the tap 40. An extraction nut 15 threadably engages the threaded shaft 16 of the drive member 7. A washer bearing member 120 sized for movable engagement on the threaded shaft 16 is disposed between the extraction nut 15 and cutting head 54. A cylindrical alignment means defining a coaxial bushing 132 is affixed to the tap 40 between the bearing surface member 120 and the cutting head 54. FIG. 11 shows the assembled injector sleeve removal tool assembly 149. FIG. 12 shows the assembly of FIG. 11 including a cylinder or sleeve 130 for engaging the bearing member 120 and providing means for positioning and/or aligning and/or limiting penetration of the tap 40 and cutting head 54 in the cylinder head 60.

Method of Use

To use the tool, cylinder 30 is placed into the injector cavity against the cylinder head 60 so that it straddles the injector sleeve 80. Now the bolt-tap-washer assembly is passed through the cylinder 30 and is urged and turned clockwise into the upper portion of the inner sleeve wall 70 of the sleeve 80 cutting threads into the inner wall of the sleeve 80. After at least one turn and preferably at two or three turns, threads are cut into the inner sleeve wall 70 sleeve, one holds the bolt head with one wrench while turning the extraction nut 15 clockwise with another wrench until the sleeve is withdrawn from the cylinder head and is loose. The area surrounding the injector sleeve 80 comprises a hollow portion 90 of the cylinder.

More particularly, the tool shown in FIGS. 1-8 and 13 is used for removing an injector sleeve 80 from the cylinder head 60 of a diesel engine while the head remains mounted to the engine block. A thread cutting device defining a tap 50, is modified by attaching a threaded tap nut 15 to its threaded distal end. A washer bearing surface member 20, having a center hole is disposed onto the threaded end of a bolt having a holding nut threaded thereon spaced apart a selected distance from the threaded distal end. The threaded distal end of the bolt is inserted into and threadably engages threads of the tap 50, so that the bolt is fastened to the tap.

As shown in FIG. 1, the end 31 of the cylinder 30 rests on the cylinder head 60 and more particularly within a conical depression or seat 34 formed around the injector bore 36 of the cylinder head 60 which serves as an alignment positioning, and support means of the cutting head and tap for pulling the injector sleeve 80.

As shown in FIG. 2, a circumferential ring 35 formed around the cylinder 30 rests on the surface of the cylinder head 60 and supports the end 31 of the cylinder 30 within a conical depression above the surface of the seat 34 formed around the injector bore 36 of the cylinder head 60 wherein the cylinder 30 provides means of aligning, positioning, and supporting the cutting head 54 of the tap 50.

As shown in FIG. 3, bolts 33 extending from around the cylinder 30 rests on the surface of the cylinder head and supports the end 31 of the cylinder 30 within a conical depression above the surface of the seat 34 formed around the injector bore 36 of the cylinder head 60 wherein the cylinder 30 provides means of aligning, positioning, and supporting the cutting head 54 of the tap 50.

As shown in FIG. 4, pins 37 extending circumferentially around the cylinder 30 rests on the surface of the cylinder head 60 and supports the end 31 of the cylinder 30 within a conical depression above the surface of the seat 34 formed around the injector bore 36 of the cylinder head 60 wherein the cylinder 30 provides means of aligning, positioning, and supporting the cutting head 54 of the tap 50.

As shown in FIGS. 5-8, the end 131 of the cylinder 130 can rest on the surface of the cylinder head 60 or within a conical depression or seat 34 formed around the injector bore 36 of the cylinder head 60 and serve as an alignment, positioning, and support means for the cutting head and tap for pulling the injector sleeve 80. Furthermore, the cylinder 30 is formed having a bottom portion 41 having a smaller diameter than a top portion 43 with the intersection forming a circumferential lip 42 which may rest upon the cylinder head 60 and be used to provide a support means to pull the injector sleeve 80.

The injector sleeve removal tool shown in FIGS. 11-13, shows the bearing surface member 120 providing a support means which can rest upon the cylinder head 60 and a tap 150 including a coaxial bushing 132 for alignment disposed between the cutting head 54 and the bearing surface member 120.

The end of the injector sleeve removal tool defining the tap assembly is passed through a hollow cylinder 30, 130 of a selected diameter. The washer bearing surface member 120 is selected having an outer diameter large enough to provide a bottom surface for resting on the top edge of the hollow cylinder 30, 130. The extraction nut 15 rests upon the top surface of the washer bearing surface member above the hollow cylinder 30, 130. The drive member 7 head 12 of the bolt opposite the tap 50, 150 assembly is rotated with a tool, whereby the distal end having the tap assembly turns to cut threads into the interior surface of the injector sleeve 80 securing same. The drive member 7 head of the bolt is held in a stationary position and the holding extraction nut 15 is then turned and moved downwardly biasing the bottom surface of the washer bearing surface member 120 against the top edges of the hollow cylinder 30, 130 pulling the injector sleeve 80 upward and out of the cylinder head 60 in order that a replacement injector sleeve can be pressed into place in the cylinder head.

The sequential steps are as follows:

1. Remove the valve cover. (est. 30 minutes)
2. Disconnect the fuel injector electrical connector.
3. Remove the internal oil, drain plugs in the cylinder head.
4. Remove the outboard fuel injector retaining bold which holds the injector.
5. Remove the fuel injector with a little light pressure.
6. Place the injector sleeve remover (THE WRENCH) in the injector bore.
7. Manually turn the injector (WRENCH) CLOCKWISE 5-6 turns (until it is tight into the injector sleeve.
8. Tighten shoulder bolt on the wrench CLOCKWISE downward until the sleeve is removed.
9. Then put the wrench into a vice and turn the wrench COUNTERCLOCKWISE until the sleeve is released from the wrench.
10. Put the new sleeve into the injector bore.
11. Insert the Driver Tool into the new sleeve that is residing in the injector bore then tap the DRIVER TOOL with a normal hammer until the sleeve fits tightly into injector bore.
12. Reconnect the outboard fuel injector retaining bold which holds the injector.
13. Reconnect the internal oil rail, drain plugs in the cylinder head.
14. Reconnect the fuel injector electrical connector.
15. Restore the Valve cover. One side is finished.

Kit

The injector sleeve removal tool can be used with a means for insertion of a new sleeve comprising a driver tool 200 as shown in FIG. 11 and sold as a kit.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. An injector sleeve removal tool comprising:

a tap with a nut welded onto a non-threaded end;

a bolt including a head including a loose nut threaded thereon and a flat washer slipped onto said bolt; and a hollow cylinder whose inner diameter is larger than the outer diameter of an injector sleeve to be removed and whose length is at least as long as said tap and welded nut combination but short enough to allow said tap section to penetrate and cut at least three threads into said injector sleeve.

2. The method of using the injector sleeve removal tool defined in claim 1 comprising the steps of:

placing said hollow cylinder into an injector cavity of a cylinder head so as to straddle an injector sleeve to be removed;

passing the threaded end of said tap through said hollow cylinder;

urging and turning said tap assembly into said injector sleeve so as to cut two or three threads into said sleeve;

turning said loose nut clockwise while holding said bolt until said sleeve is withdrawn from said cylinder head.

3. An injector sleeve removal tool for removing an injector sleeve from the cylinder head of a diesel engine between the rocker arms while the head remains mounted to the engine block within the vehicle, comprising:

a tap having a longitudinal body and a threaded cutting head at one end and an axial threaded bore at the opposing end;

a drive member comprising a bolt having a head at one distal end and a threaded shaft body portion cooperatively engaging said axial threaded bore of said tap;

an extraction nut threaded onto said threaded shaft of the drive member followed by a bearing surface member sized for movable engagement on said threaded shaft disposed between said extraction nut and said cutting head; and cylindrical alignment means disposed between said bearing surface member and said axial cutting head.

4. An injector sleeve removal tool for removing an injector sleeve from the cylinder head of a diesel engine between the rocker arms while the head remains mounted to the engine block within the vehicle, comprising:

a tap having a longitudinal body and a threaded cutting head at one end and an axial threaded bore at the opposing end;

a drive member comprising a bolt having a head at one distal end and a threaded shaft body portion cooperatively engaging said axial threaded bore of said tap;

an extraction nut threaded onto said threaded shaft of the drive member followed by a bearing surface member sized for movable engagement on said threaded shaft disposed between said extraction nut and said cutting head; and cylindrical positioning means disposed between said bearing surface member and said axial cutting head.

5. The injector sleeve removal tool of claim 4, said cylindrical positioning means extending into said head of said diesel engine a selected distance.

6. The injector sleeve removal tool of claim 5, said cylindrical positioning means including abutment means for cooperatively engaging said head of said diesel engine limiting extension therein to a selected distance.

* * * * *